United States Patent
Robert et al.

(10) Patent No.: US 6,365,056 B1
(45) Date of Patent: Apr. 2, 2002

(54) METHOD FOR PRODUCING A SUSPENDED ELEMENT IN A MICRO-MACHINED STRUCTURE

(75) Inventors: Philippe Robert, Romans; France Michel, Sassenage; Hubert Grange, Grenoble, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/331,255

(22) PCT Filed: Dec. 29, 1997

(86) PCT No.: PCT/FR97/02437

§ 371 Date: Jul. 27, 1999

§ 102(e) Date: Jul. 27, 1999

(87) PCT Pub. No.: WO98/29720

PCT Pub. Date: Jul. 9, 1998

(30) Foreign Application Priority Data

Dec. 30, 1996 (FR) ............................................. 96 16198

(51) Int. Cl.⁷ ............................................ H01L 21/302
(52) U.S. Cl. ................................ 216/2; 216/11; 216/58; 216/67; 216/72; 216/79
(58) Field of Search ................................ 216/2, 11, 58, 216/67, 72, 79

(56) References Cited

U.S. PATENT DOCUMENTS

| | | | | |
|---|---|---|---|---|
| 4,457,820 A | * | 7/1984 | Bergeron et al. | 204/192 E |
| 4,472,239 A | * | 9/1984 | Johnson et al. | 156/647 |
| 4,600,934 A | * | 7/1986 | Aine et al. | 216/2 |
| 4,685,198 A | * | 8/1987 | Kawakita et al. | 437/73 |
| 5,198,390 A | * | 3/1993 | MacDonald et al. | 437/203 |
| 5,427,975 A | * | 6/1995 | Sparks et al. | 216/2 |
| 5,610,090 A | * | 3/1997 | Jo | 437/39 |
| 6,020,272 A | * | 2/2000 | Fleming | 216/2 |

FOREIGN PATENT DOCUMENTS

JP    58-89859 A   *  5/1983

* cited by examiner

*Primary Examiner*—Anita Alanko
(74) *Attorney, Agent, or Firm*—Burns Doane Swecker & Mathis LLP

(57) ABSTRACT

A process for making at least one suspended element uses an etching technique for micro-machining a structure comprising a substrate covered in sequence by a first layer called a stop layer made of a first material, and a second layer made of a second material in which the suspended element is formed. The process uses a dry etching technique using a gas with sufficient selectivity to enable etching of the second layer without etching the stop layer, under conditions defined to enable anisotropic etching of the second material, the etching being carried out according to a first phase to delimit the suspended element as far as the level of the stop layer and being continued in a second phase during which the suspended element is released by etching of the surface layer of the suspended element delimited in the first phase and which is adjacent to the stop layer.

8 Claims, 1 Drawing Sheet

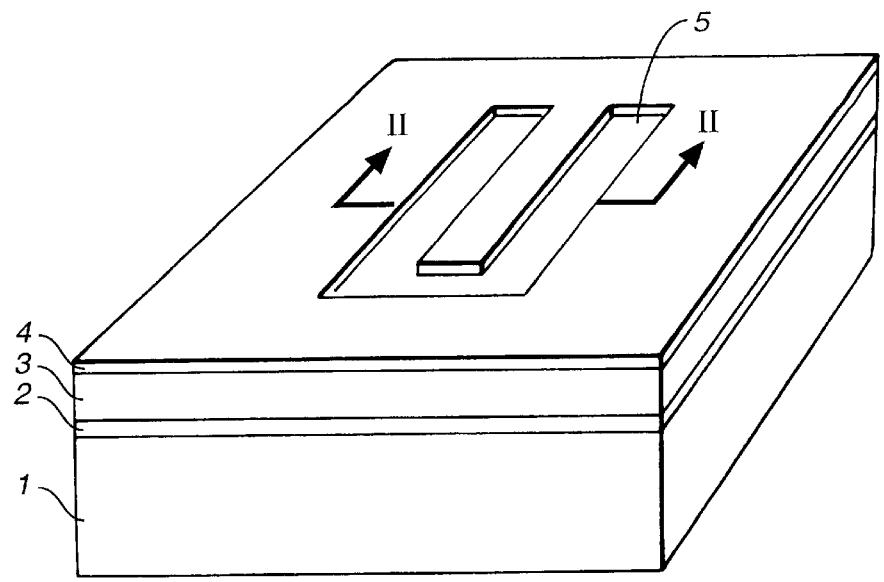
FIG._1
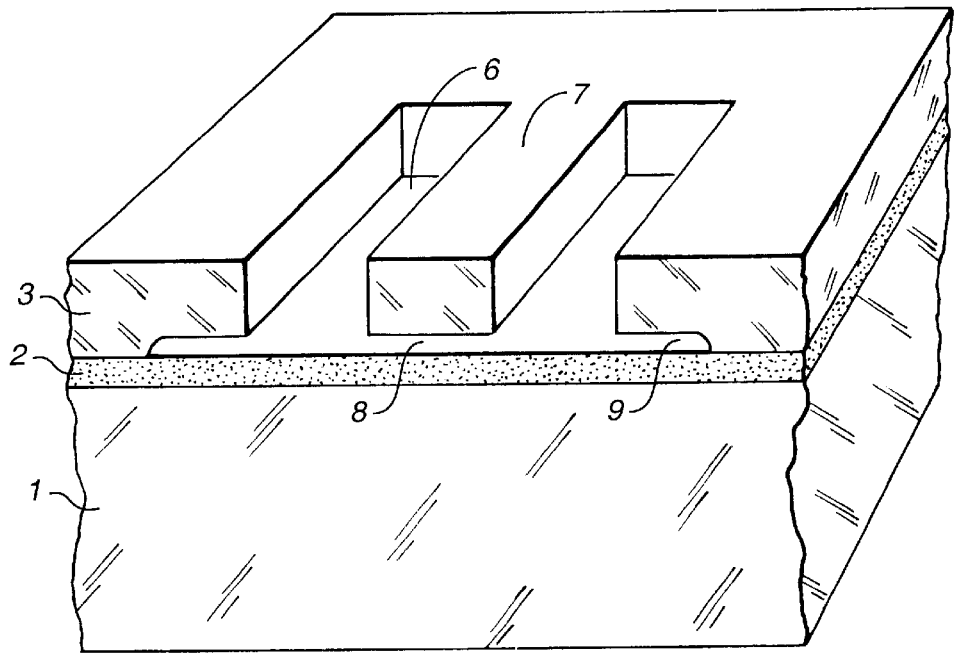
FIG._2

METHOD FOR PRODUCING A SUSPENDED ELEMENT IN A MICRO-MACHINED STRUCTURE

This invention relates to a process for making an element suspended in a micro-machined structure. This process is applicable particularly in the microelectronics field to make silicon micro-sensors (accelerometers, pressure sensors, etc.) or micro-actuators.

Micro-machined structures making use of mechanical and elastic properties of materials usually comprise at least one flexible element (beam, membrane) and are made by chemical or physicochemical etching. These types of etching are capable of isolating suspended elements within a structure of the same nature or a different nature. These suspended elements must be delimited in the plane of the structure and not attached to the mass of the structure, except at their attachment points, so that they can move to a certain extent with respect to the rest of the structure. A distinction can be made between the two main ways of releasing suspended elements.

In a first type, the suspended element is released by wet etching of a sacrificial layer. This release process is the best known and the most frequently used. Starting from a structure comprising a substrate (for example made of silicon) covered in sequence by a sacrificial layer (for example made of silicon dioxide) and a layer (for example made of silicon obtained by deposition or epitaxy) in which the suspended element will be made. The sacrificial layer is used as a spacer and a bond layer. The suspended element is obtained by etching the upper layer as far as the sacrificial layer in order to define the pattern of the suspended element. The sacrificial layer is then removed by wet etching to release the suspended element. This method is easy to implement and provides wide technological freedom. However, it has several disadvantages which are described below. The suspended element may stick to the substrate of the structure during the drying step that follows the wet etching step. The wettability of materials is not always sufficient to provide good contact between the etching solution and the sacrificial layer to be etched, particularly if the sacrificial layer is very thin or if the etched pattern is very fine. Finally, the etching solution is not always compatible with the techniques used: selective etching for some materials but not for others (for example hydrofluoric acid has very good selectivity for silicon compared with silicon dioxide, but is not selective for metallizations), and generally not CMOS compatible.

According to a second type, the suspended element is released by dry etching. This is the case for the "SCREAM" (Single-Crystal-Silicon Reactive Etching And Metallization) process. The starting point is a structure composed of a silicon substrate. A first step in this process consists of etching the substrate by dry anisotropic etching to define the suspended element. In a second step, a protection layer is deposited on the etching sides. A third step consists of performing dry isotropic etching of unprotected areas, which has the consequence of releasing the suspended element. This process does not require the presence of a sacrificial layer and, since it uses dry etching, the suspended element cannot stick on the substrate. However, this process has a number of disadvantages. The etching base obtained is neither flat nor homogeneous, which can cause problems in the case of a capacitive detection under the suspended element. Protection of the sides of the etching is not well controlled and therefore etching could be initiated an these sides during the second etching. Finally, this process involves a number of important intermediate steps and it is difficult to use.

This invention provides a process that can overcome the disadvantages of prior art. It is based on the observation made by the inventor of this invention, and has a quite unexpected and surprising aspect.

In microelectronics, dry etching processes are distinguished by the ratio between the vertical etching rate Vv and the lateral etching rate vl. If Vl=Vv, the etching is said to be isotropic. If 0<Vl<Vv, the etching is said to be quasi-isotropic. If Vl=0 and Vv>0, the etching is said to be anisotropic.

The following has been observed in tests carried out on a structure comprising a silicon substrate covered successively by an isolating stop layer (for example made of SiO2, quartz or glass), and an epitaxied layer of silicon (Silicon On Insulator or SSI structure). The epitaxied layer is masked, except for an area that is to be etched according to a pattern determined by the mask. Anisotropic dry etching is carried out on the structure by means of a gas which has sufficient selectivity with respect to the oxide layer so that the oxide layer can act as an etching stop layer. When etching reaches the stop layer, the vertical etching rate drops to zero, whereas the lateral etching rate close to the stop layer becomes non-zero and increases very quickly. There is a sudden change from an anisotropic condition (Vl=0) to an isotropic condition (Vl>0) located at the interface between the epitaxled layer and the stop layer (an increase in the proportion of neutral compounds, polarization of the substrate, etc.). The sides of the pattern which were passivated during anisotropic etching, are not modified during this second etching phase. However the silicon above the oxide layer is etched very quickly (very low apparent silicon area). The lateral etching rate under isotropic conditions is observed to be very much higher than the vertical etching rate under anisotropic conditions (about three times faster). The result is fast lateral over-etching of the silicon which is adjacent to the stop layer. This over-etching may be used to release a suspended element immediately above the stop layer.

Therefore, the purpose of the invention is a process for making at least one suspended element by using an etching technique for micro-machining a structure comprising a substrate covered in sequence by a first layer called the stop layer made of a first material, and a second layer made of a second material in which the suspended element is formed, characterized in that the process uses a dry etching technique using a gas with sufficient selectivity to enable etching of the second layer without etching the stop layer, under conditions defined to enable anisotropic etching of the second material, the etching being carried out according to a first phase to delimit the suspended element as far as the level of the stop layer and being continued in a second phase during which the suspended element is released by etching of the surface layer of the suspended layer delimited in the first phase and which is adjacent to the stop layer.

Preferably, the dry etching is done using a reactive etching type technique.

Dry etching may be done in an STS (Multiplex ICP) machine or in an Alcatel 602E machine.

The process according to the invention is particularly applicable to the manufacture of at least one element suspended in a structure in which the stop layer is made of silicon dioxide and the second layer is made of silicon.

The invention will be better understood by means of the following description given as a non-restrictive example accompanied by attached drawings in which:

FIG. 1 is a perspective view of an SSI structure in which a suspended element will be made using the process according to the invention, FIG. 2 is a cross-sectional view along axis II—II in FIG. 1, showing the structure etched by the process according to the invention.

FIG. 1 shows a perspective view of an SSI type structure comprising a silicon substrate 1, covered on one surface by a silicon oxide layer 2 and a silicon layer 3 deposited or epitaxied on the oxide layer 2. In order to etch a suspended element composed of a beam in the silicon layer 3, a mask 4 is deposited on the silicon layer 3. For example, this mask 4 may consist of a photosensitive resin film or an oxide layer (for example $SiO_2$) and may comprise a U-shaped opening 5 to delimit the suspended element.

Etching is done in an STS machine. It is a reactive or RIE (Reactive Ion Etching) etching. The gas used is sulfur hexafluoride $SF_6$. Cl or $CHF_3O_2$ could also be used. Etching is done under pressure and high frequency power conditions determined to obtain a highly anisotropic (vertical) etching of the silicon. The silicon layer located just below opening 5 in the mask 4 is etched in the first etching phase as far as the oxide layer 2. Etching then continues laterally in the second etching phase just above the oxide layer 2. Etching is stopped when the suspended element is released from the oxide layer.

FIG. 2 shows the result obtained after removing mask 4. The silicon layer 3 shows a recess 6 delimiting the suspended element 7 in the form of a beam. The beam 7 which cantilevers over the rest of layer 3 is separated from the oxide layer 2 by a space 8 created by lateral etching of the surface layer of silicon supported on layer 3. It is observed at the bottom of the recess 6, that the surface silicon on layer 2 has also been etched near the outside to form a space 9 surrounding the recess 6.

The process according to the invention can be used to make suspended elements by dry etching, which eliminates material wettability problems. This also avoids problems of the suspended element sticking to the rest of the structure. This process is VLSI compatible. The sides and base of the etching are controlled and clean. Another advantage is due to the fact that etching and release of the suspended elements take place in a common step.

This process may beneficially be applied to the production of comb-shaped microstructures, the production of micro-sensors (accelerometer, pressure sensor, etc.), or the production of micro-actuators.

What is claimed is:

1. Process for making at least one suspended element by using an etching technique for micro-machining a structure comprising a substrate covered in sequence by a first layer called a stop layer made of a first material, and a second layer made of a second material in which the suspended element is formed, in which the process used is a dry etching technique using a gas with sufficient selectivity to enable etching of the second layer without etching the stop layer, under conditions defined to enable anisotropic etching of the second material, the etching being carried out according to a first phase to delimit the suspended element as far as the level of the stop layer and being continued in a second phase during which the suspended element is released by isotropic etching of the second layer of the suspended element delimited in the first phase and which is adjacent to the stop layer.

2. Process according to claim 1, in which the dry etching technique used is a reactive etching type.

3. Application of the process according to claim 1 to the production of at least one suspended element in a structure in which the stop layer is made of silicon dioxide and the second layer is made of silicon.

4. Application of the process according to claim 2 to the production of at least one suspended element in a structure in which the stop layer is made of silicon dioxide and the second layer is made of silicon.

5. Process for making at least one suspended element by using an etching technique for micro-machining a structure comprising a substrate covered in sequence by a first layer called a stop layer made of a first material, and a second layer made of a second material in which the suspended element is formed, in which the process used is a dry etching technique using a gas with sufficient selectivity to enable etching of the second layer without etching the stop layer, under conditions defined to enable anisotropic etching of the second material, the etching being carried out according to a first phase to delimit the suspended element as far as the level of the stop layer and being continued in a second phase during which the suspended element is released by etching of the second layer of the suspended element delimited in the first phase and which is adjacent to the stop layer, wherein the transition from the first phase to the second phase is at least partially attributable to interaction between the gas and the stop layer.

6. Process according to claim 5, in which the dry etching technique used is a reactive etching type.

7. Application of the process according to claim 5 to the production of at least one suspended element in a structure in which the stop layer is made of silicon dioxide and the second layer is made of silicon.

8. Application of the process according to claim 6 to the production of at least one suspended element in a structure in which the stop layer is made of silicon dioxide and the second layer is made of silicon.

* * * * *